June 15, 1965  C. GETMAN  3,189,020
OVEN DOOR WITH FLOATING INNER PANEL
Filed Nov. 29, 1963  2 Sheets-Sheet 1

INVENTOR.
CLARENCE GETMAN
BY Richard L. Caslin
HIS ATTORNEY

June 15, 1965  C. GETMAN  3,189,020

OVEN DOOR WITH FLOATING INNER PANEL

Filed Nov. 29, 1963  2 Sheets-Sheet 2

INVENTOR.
CLARENCE GETMAN
BY Richard L. Caslin
HIS ATTORNEY

United States Patent Office 3,189,020
Patented June 15, 1965

3,189,020
OVEN DOOR WITH FLOATING INNER PANEL
Clarence Getman, Louisville, Ky., assignor to General Electric Company, a corporation of New York
Filed Nov. 29, 1963, Ser. No. 326,907
5 Claims. (Cl. 126—190)

The present invention relates to ovens and other heated cavities and particularly to the construction of an access door to insure that the high temperatures employed therein do not cause such thermal and mechanical stresses that will inflict damage on the inner surface of the door.

This invention was conceived during the recent development of a new concept in baking ovens for domestic use wherein the soiled interior oven walls are cleaned automatically by using a high temperature heat cleaning cycle. A major annoyance in using an oven is the difficulty encountered in keeping the walls of the oven liner clean. During the normal cooking operations food particles and grease spatterings often form on the hot walls of the oven liner where they are partially burned and hence adhere tenaciously thereto. Strong cleaning agents have been devised for application to the oven walls for the express purpose of easing the task of removing food soil from them. However, even the best of these cleaning agents require a strong rubbing action and they comprise strong chemicals which must be used properly so as to avoid damage to the skin, eyes and clothing. Such a high temperature self-cleaning oven is described and claimed in the copending application, now Patent No. 3,121,158, of Bohdan Hurko, Serial No. 244,493, filed December 13, 1962, which application is assigned to the General Electric Company, the assignee of the present invention. This Hurko application is a continuation-in-part application of an earlier application Serial No. 27,926, filed May 9, 1960, and which is now abandoned.

The porcelain enamel finish on the interior metal surface of the oven liner and door forming the oven cavity is much more subject to crazing in a high temperature self-cleaning oven than in a conventional baking oven where the normal cooking temperatures vary anywhere between 150° F. and 550° F. The heat cleaning temperature is somewhere in a range between 750° F. and 950° F., and in the production oven embodying this invention, the maximum oven air temperature is about 880° F. It is desirable to restrict the temperature of the outer walls of the oven construction to a maximum temperature of about 194° F. especially at the two sides of the oven of a free-standing range; for example, where the range might be built into a kitchen counter and the side walls would be mounted flush against the wooden walls of the counter. For this reason, the oven liner is provided with an increased amount of heat insulating material such as fiberglass completely surrounding the oven liner. In addition, a forced ventilating system has been adopted to circulate relatively cool room air over the controls of the range and between the outer walls of the range body and the insulated oven liner so as to obtain the advantage of cool outer range wall surface temperatures during normal cooking and to prevent excessive temperatures during the heat cleaning cycle.

The principal object of the present invention is to provide a door of a domestic oven or other heated cavity with a floating inner panel forming one wall of the cavity so as to allow the inner panel to expand freely and prevent the setting up of excessive thermal and mechanical stresses due to differences in the rate of expansion of the door proper and its inner panel.

A further object of the present invention is to provide a mounting system for the inner panel of a door of the class described to permit limited parallel movement therebetween and prevent the relative separation thereof.

A still further object of the present invention is to provide a floating inner panel of a door of the class described with insulating means for restricting the conduction of heat from the inner panel to the door proper.

The present invention, in accordance with one form thereof, is embodied in a door construction for a heated cavity where the door is formed of three main parts, namely, an outer door panel, an inner door liner and a floating inner panel that is adapted to serve as one of the walls that form the heated cavity. Heat insulating material is interposed between the outer door panel and the inner door liner, and fastening means hold these parts together. Thermal gasketing material is sandwiched between the floating inner panel and the inner door liner to serve as a door gasket as well as to restrict the conduction of heat from the inner panel to the inner door liner. A means is provided for suspending the top edge of the inner panel to the door liner, while spaced bracket members hold the inner panel to the door liner to prevent the separation thereof while permitting the relative parallel movement therebetween so as to allow the inner panel to expand and contract freely and thereby minimize crazing of the porcelain enamel formed on the innermost surface of the inner door panel.

My invention will be better understood from the following description taken in conjunction with the accompanying drawings and its scope will be pointed out in the appended claims.

Figure 1:
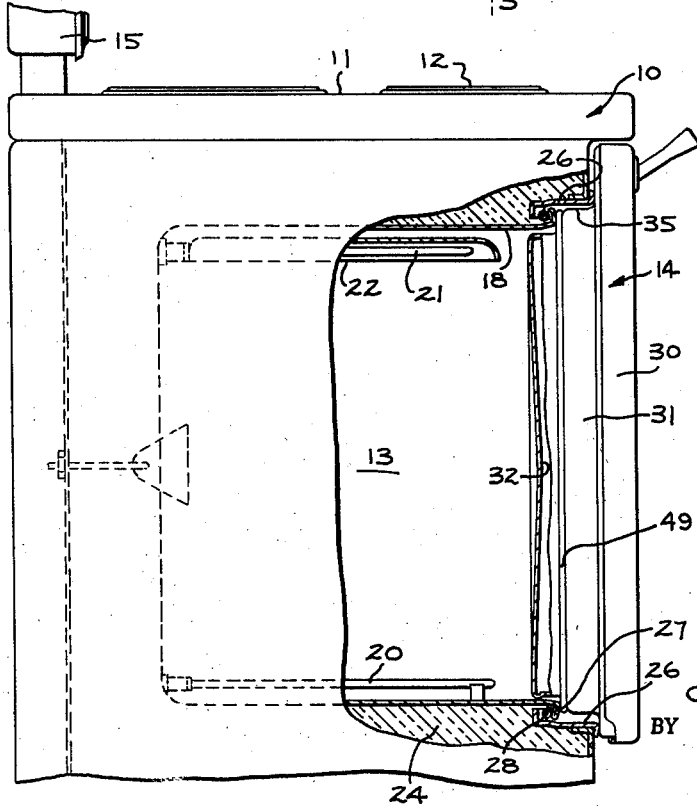
FIGURE 1 is a fragmentary left side elevational view of a free-standing range having a self-cleaning oven embodying the present invention with parts broken away to illustrate the interrelation between the oven door and the oven cavity.

Turning now to a consideration of the drawings and in particular to FIGURE 1 there is shown for illustrative purposes a free-standing electric range 10 having a top cooking surface 11 with a plurality of surface heating elements 12, an open cavity 13, a front-opening drop-door 14 for the oven, and a backsplash 15 arranged along the back edge of the cooking surface 11 and containing a control panel in the front face thereof which includes a plurality of manual control devices (not shown) which govern the energization of the various heating elements of the range. The oven cavity 13 is formed by a box-like oven liner 18 that has an open front that is adapted to be closed by the oven door 14 that was mentioned previously.

As in standard electric ovens, there is a lower heating element or bake unit 20 and an upper heating element or broil unit 21. Combined with the broil unit 21 is a metal reflector 22 that overlies the broil unit and allows most of the heat energy developed by the unit to be directed down toward the food placed thereunder. Both the bake and broil units 20 and 21 are provided with electrical terminals that extend out through the back wall of the oven liner for connection to power lead wires (not shown) as is standard in this art. The oven liner 18 is insulated from the range body 10 by having a relatively thick blanket of fiberglass insulation 24 completely surrounding the liner in order to prevent the dissipation of heat energy from the oven cavity, as well as to maintain the temperature of the outer walls of the range 10 at a safe temperature below the maximum of 194° F. which is a requirement of the Underwriters' Laboratories, Inc. Another way of restricting the temperature of the walls of the range body 10 is to include a forced ventilating system (not shown) for circulating room air between the insulated oven liner and the walls of the range body.

It is important to be able to restrict the loss of heat in the vicinity of the oven door 14 thereby making it possible to maintain uniform, internal oven wall temperatures and thereby obtain a one-hundred percent self-cleaning action. Several steps have been taken in order to accomplish this objective, and the first one is to thermally isolate the oven liner 18 from the range body 10. This is possible by utilizing a breaker frame 26 to line the edges of the door opening in the manner that is taught in the patent of James K. Newell, Jr., 3,017,488 which is assigned to General Electric Company, the assignee of the present invention. This breaker frame 26 is of generally Z-shape in transverse cross-section, and it is held in the door opening by applying a tension force to the back on the oven liner 18 so that a peripheral flange 27 at the front edge of the oven liner will press against the breaker frame 26 and tighten the frame in place. Moreover, a third heating element referred to as a mullion or perimeter heater 28 is sandwiched between the breaker frame and the peripheral flange 27 of the oven liner so as to compensate for the heat loss in the vicinity of the door opening and thereby hold generally uniform wall temperatures throughout the oven cavity.

Figure 3:
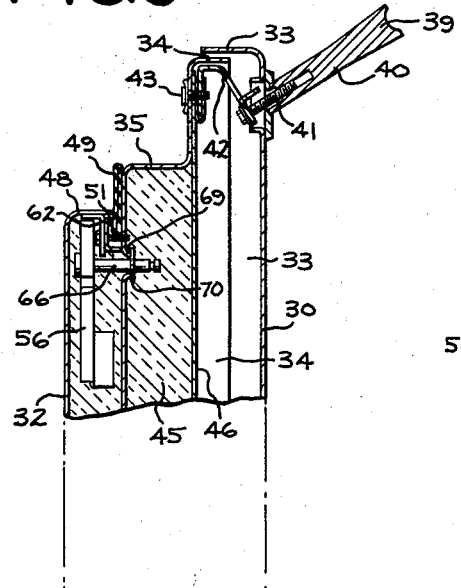
FIGURE 3 is a transverse cross-sectional elevational view, taken through the oven door of FIGURE 2 on the line 3—3 thereof.
Figure 3:
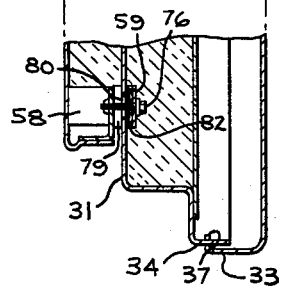

As is best seen in FIGURE 3, the oven door 14 is of sheet metal construction having three main elements, an outer door panel 30, an inner door liner 31 and a floating inner panel 32. The outer door panel 30 is of shallow pan-shape by virtue of the fact that it has a rearwardly-turned peripheral flange 33. The inner door liner 31 is also of pan-shape and it is of mating construction by virtue of the fact that it has a front-turned peripheral flange 34 which telescopes within the flange 33 of the outer door panel 30. The inner door liner 31 includes a generally rectangular, central, outer embossment 35 of such a size as to fit closely within the breaker frame 26 as is best seen in FIGURE 1.

Figure 2:
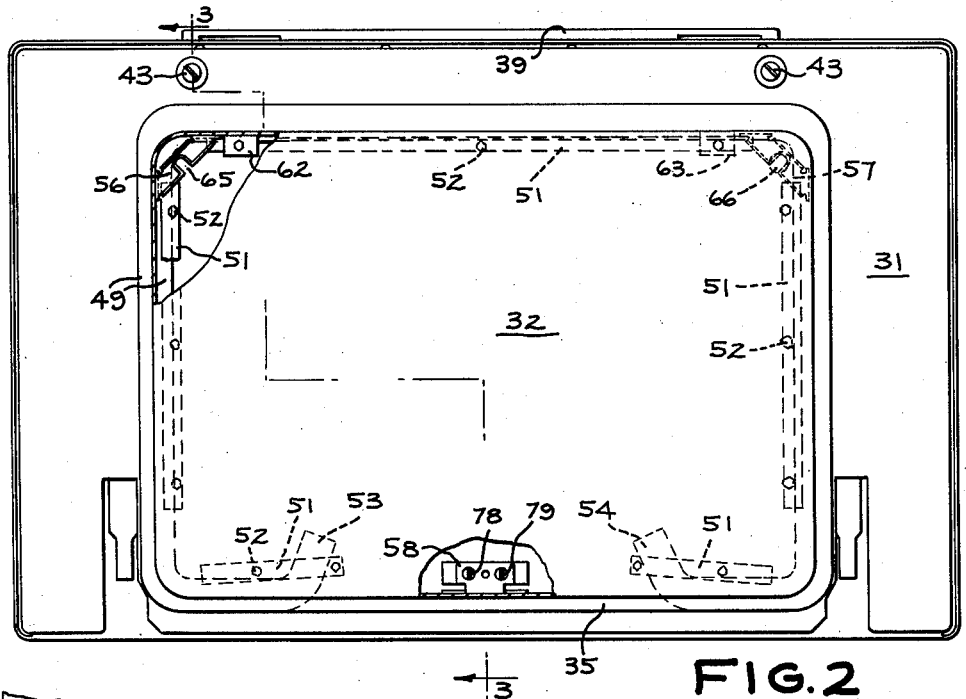
FIGURE 2 is an elevational view of the inside surface of the oven door separated from the oven and with parts broken away to show the details of the supporting and fastening means for the inner door panel at the top corners thereof as well as at the central portion of the bottom edge thereof.

Next, the method of fastening the inner door liner to the outer door panel will be discussed with relation to FIGURE 3. The lower portion of the peripheral flange 33 of the outer door panel 30 has a series of vertical tabs 37 which are adapted to fit into mating slots (not shown) in the lower portion of the peripheral flange 34 of the inner door liner 31. The upper portion of the outer door panel is provided with a door handle 39 of extended width as is best seen in FIGURE 2. The handle 39 has two support points or posts 40 which are spaced apart to lie at each end of the handle. Each post accommodates a fastening screw 41 that extends from the rear through a suitable opening in the outer door panel 30 and assembles the handle in place. A mounting clip 42 is also held down by the fastening screw 41. This clip extends rearwardly from the handle connection for cooperation with a second fastening screw 43 that extends through an opening in the inner door liner and into an opening in the clip member. Thus, it can be seen that the bottom portion of the inner door liner is held to the outer door panel by the interlocking tabs 37 and mating slots (not shown), while the top portions of these two members are fastened together by the two groups of fastening screws 41 and 43 that cooperate with the door handle 39.

Insulation 45 is assembled within the outer embossment 35 of the inner door liner as is best seen in FIGURE 3, and it is held in place by a flat plate 46 such as aluminum which has its corner edges tucked behind and into suitable crevices so that the plate does not rattle or become loosened.

This brings us to a consideration of the floating door panel 32 which is likewise of shallow pan-shape having a front-turned peripheral flange 48, and it covers an area that is slightly less than the area of the outer embossment 35 of the inner door liner. It is important to be able to restrict the conduction of heat from the floating inner panel 32 to the inner door liner 31 so that the outer surface of the door does not become overheated. This is done by the cooperation of a strip or belt of thermal gasket material 49 such as fine fiberglass of woven construction which is sandwiched between the edge of the peripheral flange 48 of the inner panel and the embossment 35 of the inner door liner 31. This gasket 49 extends around the inner door panel to serve as a door gasket that is adapted to seat against the peripheral flange 27 of the oven liner as is seen in FIGURE 1. Notice also that the floating inner panel 32 protrudes into the mouth of the oven liner 18 and is surrounded by the mullion or perimeter heater 28 for best heat distribution and compensation for heat loss through and around the door. The extent of the fiberglass gasket 49 is best illustrated in FIGURE 2 as is shown in dotted lines as encompassing the inner panel except at the bottom where the two ends of the gasket do not meet. The gasket is attached to the embossment 35 by a series of metal strips or hold-downs 51 which overlies the innermost edge of the gasket and are assembled to the inner door liner by means of fastening screws 52. The two ends 53 and 54 of the gasket 49 are spaced from each other by a distance of about one-half of the width of the embossment 35. This is for the purpose of permitting a measured amount of room air to be drawn into the oven cavity during the heat cleaning cycle so as to promote the necessary oxidation of the food soil at the high temperature heat cleaning range.

Now arises the task of attaching the floating inner panel 32 to the inner door liner 31 in such a manner that the exposure of the inner panel to the high oven temperatures between about 750° F. and 950° F. does not set up undue thermal and mechanical stresses due to a difference in the rate of thermal expansion between the inner panel and the relatively rigid inner door liner. The outermost surface of the outer door panel 30 is provided with a porcelain enamel finish to correspond to the appearance finish of the range, while the rearward facing surface of the inner door liner 31 as well as the inner panel 32 are covered with a porcelain enamel finish to blend with the porcelain enamel finish of the inner surface of the oven liner 18. The high temperature exposure of the inner panel 32 renders the porcelain enamel thereon much more subject to crazing than any other portion of a conventional oven.

It has been found that the method of mounting this inner panel 32 is extremely critical. Not only must the inner panel be allowed to expand freely, due to a difference in rate of thermal expansion of the inner panel and the inner door liner, but the method of supporting the weight of the inner panel is also quite important so as to minimize crazing. Turning now to FIGURE 2, there is shown a five point support arrangement of the inner panel 32 with the embossment 35 of the inner door liner 31. Each top corner of the inner panel 32 is provided with a welded, diagonal corner bracket 56 and 57 respectively, while the lower central portion of the inner panel is provided with a rigid clamp bracket 58 cooperating with a screw-fastened clamp member 59 which extends through elongated slots 60 in the inner door liner as will be better understood hereinafter with reference to FIGURE 5. Moreover, the weight of the inner panel 32 is carried by a pair of spaced support brackets 62 and 63 respectively, best seen in FIGURE 2, that are fastened over the gasket-clamping strip 51 at the top portion of the embossment 35. Each support bracket 62 and 63 has a ledge, as is best seen in FIGURE 3, over which the peripheral flange 48 of the inner panel 32 is hooked so as to carry the vertical load of the inner panel 32 when the door is in its normal closed position.

Figure 4:
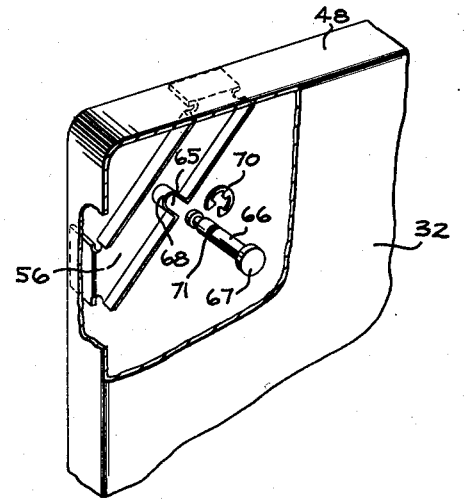
FIGURE 4 is a fragmentary, front, perspective view on an enlarged scale of the top left corner of the inner door panel with a portion broken away to uncover the corner bracket which is adapted to receive a fastening pin therethrough.

Looking at FIGURE 4, the welded, diagonal corner bracket 56 is of generally channel-shape cross-section for rigidity, and it is provided with a notched portion 65 in one side edge thereof to permit a fastening pin 66 to be slipped into the notch while its enlarged head 67 engages behind the corner bracket and prevents the pin from slipping axially therethrough. Again, for the sake of rigidity, this notch 65 is provided with a narrow reinforcing edge 68 as is best seen in FIGURE 4, to prevent distortion of the bracket under load as well as to facilitate the ease of the pin rocking with respect to the bracket during relative movement of the door elements. A suitable countersunk hole 69, as seen in FIGURE 3, is formed in the embossment 35 of the inner door liner for receiving the shank of the fastening pin 66 therethrough, and a C-shaped retainer or clip 70 is provided to slip into an undercut 71 of the fastening pin, as seen in FIGURE 4, for holding the pin and hence the panel 32 in place so as to apply a slight compressive force against the fiberglass gasket 49. The head of the fastening pin 66 is loosely connected in the notch 65 so as to provide relative pivotal movement therebetween and thereby permit relative parallel movement between the inner panel 32 and the inner door liner 31, while positively restricting any axial movement or separation of the inner panel from the inner door liner. This parallel movement allows for thermal expansion of the inner panel with respect to the inner door liner without setting up undue mechanical and thermal stresses.

A secondary function of the corner brackets 56 and 57 is to support the weight of the inner panels and transmit the weight or load to the support brackets 62 and 63. The weight is supported at these corner positions not only because the corner brackets make the structure more rigid, but also because the little distortion that may occur will tend to put the procelain enamel in compression which is an ideal condition to prevent crazing. Looking at FIGURE 1, it is clear that the inner panel 32 is slightly concave outwardly of the oven cavity in that the panel has been caved in slightly for the same reason, that is, to place the procelain enamel under compression when thermal expansion takes place.

Figure 5:
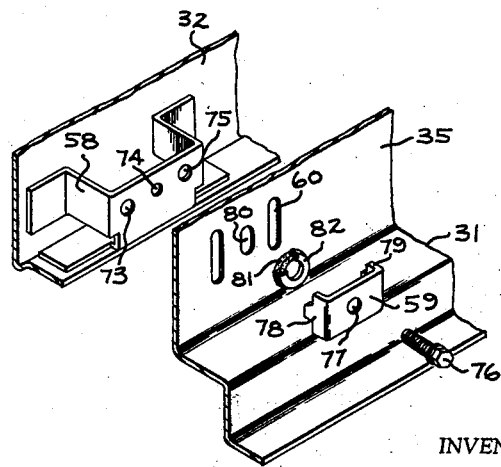
FIGURE 5 is a fragmentary exploded view on an enlarged scale in the vicinity of the bottom central portion of the inner door panel showing the manner of clamping the floating panel to the inner door liner.

Looking again at the clamping arrangement at the bottom central portion of the inner panel 32 as seen in FIGURE 5, the clamping bracket 58 is welded to the inside of the inner panel 32 and is provided with three openings 73, 74 and 75. The central opening 74 is a hole for receiving a fastening screw 76 that is adapted to fit through a suitable opening 77 in a clamp member 59 that is located within the inner door liner 31. The clamping member 59 is of generally U-shape with a pair of arms 78 and 79 which are adapted to fit completely through elongated slots 60 in the embossment 35 of the inner door liner. The tips of the arms 78 and 79 are sharpened to be converging and fit snugly with a wedging action into the openings 73 and 75 respectively in the clamping bracket 58. The fastening screw 76 extends through an elongated opening 80 that is centered between the two elongated slots 60 in the embossment 35. The clamping bracket 58 does not directly touch in any way the inner door liner 31 because it is naturally spaced therefrom by the fiberglass door gasket 49, as is best seen in FIGURE 3. It is also well to space the clamping member 59 from the inner door liner and this is done by utilizing an asbestos washer or pad 81 with a metal washer or cap 82 between the base of the member 59 and the inner liner 31. This washer 81 also serves as an anti-rattle device. Hence, when the fastening screw 76 is extended through the hole 77 in the clamping member 59 it is also placed through the pad 81 and cap 82, opening 80 and finally threaded into the central opening 74 in the clamping bracket 58. In so doing, the clamping member 59 is positioned with its side arms 78 and 79 extending through the elongated slots 60 and with its sharpened ends wedged into the spaced openings 73 and 75. This provides for limited vertical movement of the inner panel with relation to the inner door liner in both its up and down directions; while preventing any sidewise movement, as well as any separation between the inner panel and inner door liner.

Modifications of this invention will occur to those skilled in this art and therefore it is to be understood that this invention is not limited to the particular embodiments disclosed but that it is intended to cover all modifications which are within the true spirit and scope of this invention as claimed.

What I claim as new and desire to secure by Letters Patent of the United States is:

1. In a domestic oven comprising a body with an insulated oven liner and a front-opening access door to define a heated cavity; the invention comprising a door design having an outer door panel, an inner door liner, and a floating inner panel, means holding said inner door liner to said outer door panel, and bracket means on the inner door liner for suspending said inner panel along its top edge so the inner panel is adapted to protrude into the oven liner, an elongated resilient gasket sandwiched between said inner door liner and said inner panel around the periphery thereof, pin means at two of the opposite corners of said inner panel and connected between the inner panel and said inner door liner, said pin means having limited relative movement between the inner panel and the inner door liner, and a slidable connecting means between a portion of the inner panel remote from said pin means, said connecting means serving to prevent the inner panel from moving away from the inner door liner while permitting relative parallel movement therebetween.

2. A door for a heated cavity comprising an outer door panel, an inner door liner, and a floating inner panel that is adapted to serve as one of the walls forming the said cavity, means holding said inner door liner to said outer door panel, pin means adjacent the top corners of the inner panel and joining the inner panel to the inner door liner, each pin means being relatively movable with respect to the adjacent inner panel and inner door liner respectively, and a slidable connecting means joining the bottom edge of the inner panel adjacent the center thereof to the inner door liner, said connecting means being capable of relative sliding movement in a direction generally perpendicular to the bottom edge of the inner panel, and a strip of resilient gasket material interposed between the peripheral edge of said inner panel and said inner door liner.

3. In a high temperature domestic oven having a front wall provided with an access opening therein; the invention comprising an insulated door adapted to provide a closure for said opening, said door having an outer door panel, an inner door liner, and a floating inner panel, the door panel having a rearwardly-turned peripheral flange, said inner door liner having a front-turned peripheral flange telescoped with the flange of the outer door panel, the inner door liner having a generally rectangular central outer embossment slightly larger than the said access opening, and fastening means for assembling the inner door liner to the outer door panel, the inner panel being slightly smaller in size than said embossment and having a front-turned periperhal flange, a strip of thermal gasket material sandwiched between the said flange of the inner panel and the embossment of the inner door liner, bracket means interposed between the inner door liner and inner panel for suspending the top portion of the inner panel from the door liner, pin means adjacent the top corners of the inner panel joining the inner panel to the inner door liner, each pin means having limited relative movement between the inner panel and inner door liner respectively, and a slidable connecting means joining the bottom edge of the inner panel adjacent the center thereof to the inner door liner, said connecting means being capable of relative sliding movement in a direction generally perpendicular to the bottom edge of the inner panel, and thermal insulating material interposed between the inner panel and inner door liner.

4. A door construction for a high temperature oven having an insulated oven cavity formed by a box-like oven liner and a front-opening access door, both the door and oven liner having procelain enameled appearance surfaces capable of withstanding the high temperatures; the invention comprising a door design having an outer door panel, an inner door liner, and a floating inner panel, thermal insulation interposed between the door panel and door liner as well as between the door liner and the inner panel, fastening means for assembling the door liner to the door panel, the inner panel having a front-turned peripheral edge, a strip of thermal gasket material sandwiched between the peripheral edge of the inner panel and the door liner and extending beyond the confines of the inner panel to serve as a door gasket that is adapted to seat against the mouth of the oven liner, bracket means at the top portion of the inner panel for suspending the inner panel from the door liner, a bracket member attached within the inner panel at each top corner thereof, and tension means connected between each bracket member and the door liner to prevent the separation of the inner panel and door liner while permitting relative parallel movement therebetween, and clamp means connected between the inner panel and the door liner at the bottom center of the inner panel, and guide ways associated with the clamp means to permit only relative vertical movement between the inner panel and door liner and prevent both the separation thereof and any relative sideways movement therebetween.

5. A door construction for a high temperature domestic oven having an insulated oven cavity formed by a box-like oven liner and a front-opening access door, both the door and oven liner having porcelain enamel appearance surfaces capable of withstanding the high temperatures; the invention comprising a door design having an outer door panel, an inner door liner, and an inner panel, thermal insulation interposed between the door panel and door liner as well as between the door liner and the inner panel, fastening means for assembling the door liner to the door panel, the inner panel having a front-turned peripheral edge, a strip of thermal gasketing material sandwiched between the peripheral edge of the panel and the door liner and extending beyond the confines of the inner panel to serve as a door gasket that is adapted to seat against the mouth of the oven liner, bracket means attached to the door liner adjacent the top portion of the inner panel for suspending the inner panel from its edge, a corner bracket member attached within the inner panel at each top corner thereof, and a pin connected between each corner bracket and the door liner to prevent the separation of the inner panel and door liner while permitting relative parallel movement therebetween, a bracket member attached to the inside of the inner panel at the bottom central portion thereof and a clamp member located within the door liner and extending through elongated slots in the door liner for connection with the last mentioned bracket, and resilient means holding the clamp member away from the door liner to prevent metal-to-metal contact while permitting relative parallel movement between the inner panel and door liner to prevent both the separation thereof and any relative sidewise movement therebetween.

References Cited by the Examiner

UNITED STATES PATENTS

| 2,797,680 | 7/57 | Nagel | 126—19 |
| 2,836,268 | 5/58 | Evans | 126—190 |
| 2,939,452 | 6/60 | Kamin | 126—190 |

JAMES W. WESTHAVER, *Primary Examiner.*

KENNETH W. SPRAGUE, *Examiner.*